(12) United States Patent
Christoffel et al.

(10) Patent No.: US 8,398,044 B2
(45) Date of Patent: Mar. 19, 2013

(54) LONGITUDINAL ADJUSTER FOR A VEHICLE SEAT

(75) Inventors: Thomas Christoffel, Herschweiler (DE); Norbert Heeg, Dahn (DE); Wolfgang Pluta, Imsweiler (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 307 days.

(21) Appl. No.: 12/840,434

(22) Filed: Jul. 21, 2010

(65) Prior Publication Data

US 2011/0017897 A1    Jan. 27, 2011

(51) Int. Cl.
*F16M 13/00*    (2006.01)
*G01B 7/14*    (2006.01)

(52) U.S. Cl. .................. 248/429; 248/424; 324/207.13; 324/207.24

(58) Field of Classification Search .......... 248/429, 248/430, 420, 423, 424, 550; 297/344.1, 297/344.11, 341, 468; 324/207.2, 207.24, 324/207.13, 207.22, 207.23, 207.25
See application file for complete search history.

(56) References Cited

U.S. PATENT DOCUMENTS

| | | | |
|---|---|---|---|
| 6,095,555 A | | 8/2000 | Becker et al. |
| 6,774,625 B2 * | | 8/2004 | Suzuki et al. ............ 324/207.24 |
| 7,439,735 B2 | | 10/2008 | Barnabo et al. |
| 7,511,479 B2 * | | 3/2009 | Schuler et al. ............ 324/207.2 |
| 7,521,924 B2 | | 4/2009 | Okumura et al. |
| 7,564,234 B2 * | | 7/2009 | Endoh et al. ............. 324/207.24 |
| 7,999,539 B2 * | | 8/2011 | Nishide ..................... 324/207.26 |
| 2001/0017897 A1 * | | 8/2001 | Ahn ............................... 375/261 |
| 2003/0160607 A1 * | | 8/2003 | Suzuki et al. .............. 324/207.2 |
| 2004/0196029 A1 * | | 10/2004 | Okumura et al. ........ 324/207.24 |
| 2005/0099175 A1 * | | 5/2005 | Barnabo et al. ............ 324/207.2 |
| 2007/0108748 A1 | | 5/2007 | Ventura et al. |

FOREIGN PATENT DOCUMENTS

DE    10357750    7/2004
DE    102004030282    1/2006

* cited by examiner

*Primary Examiner* — Tan Le
(74) *Attorney, Agent, or Firm* — McGlew and Tuttle, P.C.

(57) ABSTRACT

A longitudinal adjuster for a vehicle seat (3) has a first seat rail (5) fixed to the vehicle structure and arranged on a vehicle floor (10) and a second seat rail (8) fixed to the seat and displaceable in relation to the first seat rail (5) and guided in same. A position detection device (20) is provided with a sensor (24), having a magnet and a Hall element. The sensor (24) is arranged in the interior of the second seat rail (8) and aligned with a flat area associated with the first seat rail (5) in which one end of the flat area corresponds to the end of the rail and the flat area forms a detection area. The sensor (24) is used to detect an end of the detection area. The sensor (24) has a certain detection range and the distance between the sensor (24) and the detection area lies within the certain detection range of the sensor (24). The distance between the sensor (24) and the vehicle floor (10) lies outside of the certain detection range of the sensor (24).

16 Claims, 2 Drawing Sheets

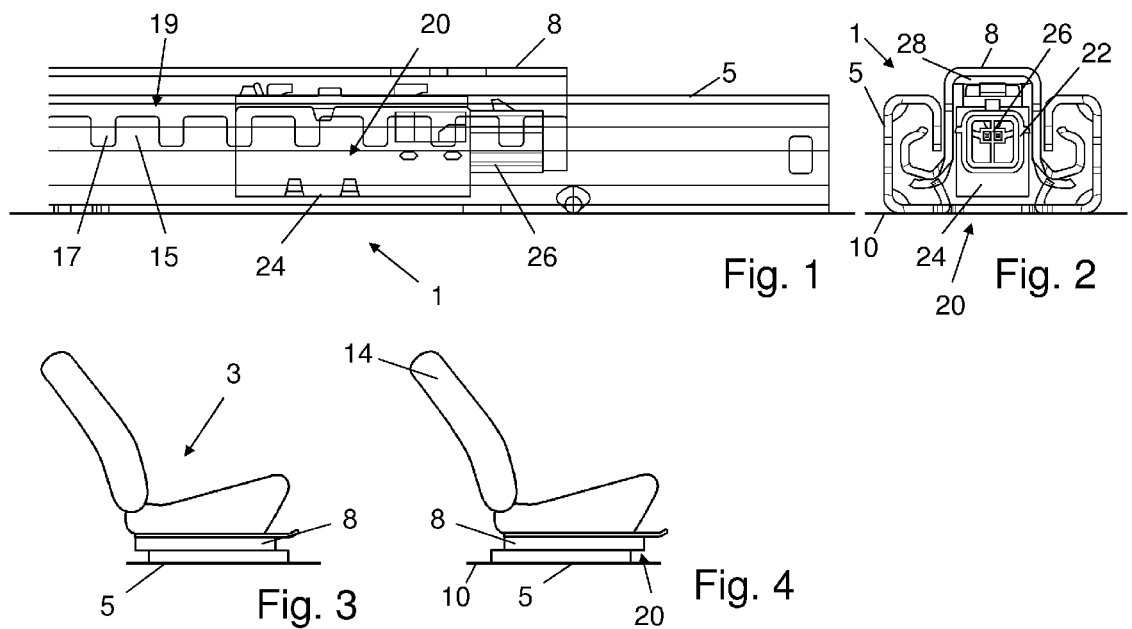

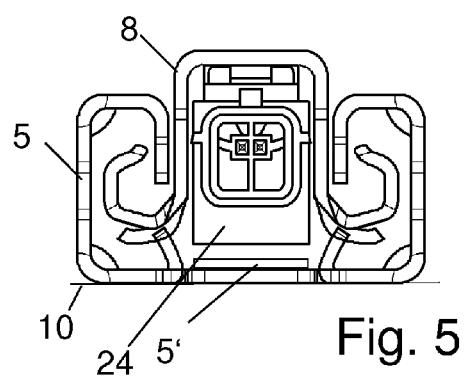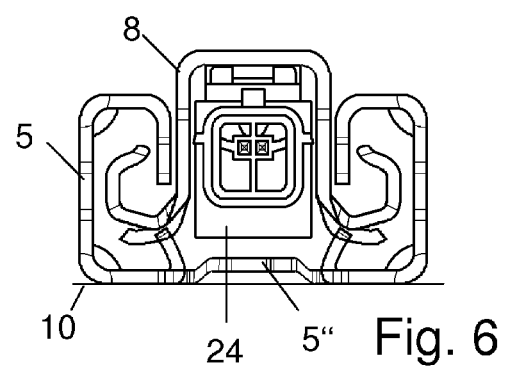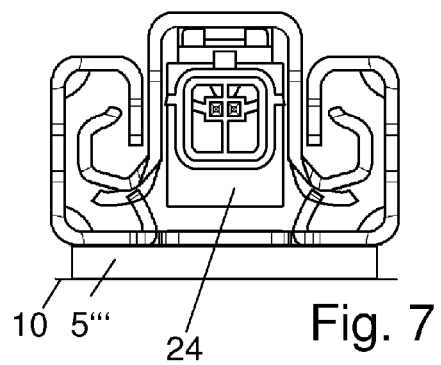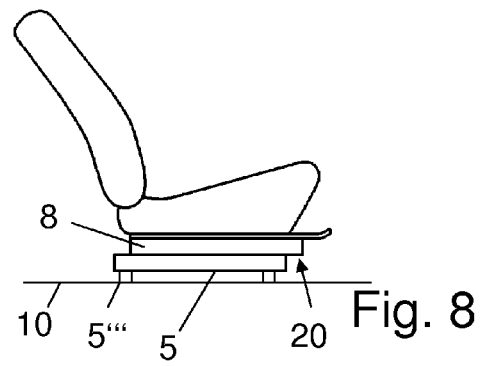

LONGITUDINAL ADJUSTER FOR A VEHICLE SEAT

CROSS REFERENCE TO RELATED APPLICATIONS

This application claims the benefit of priority under 35 U.S.C. §119 of German Patent Application DE 10 2009 034 191.9-14 filed Jul. 22, 2009, the entire contents of which are incorporated herein by reference.

FIELD OF THE INVENTION

The present invention pertains to a longitudinal adjuster for a vehicle seat, especially for a motor vehicle seat, with at least one first seat rail fixed to the vehicle structure and arranged on a vehicle floor, at least one second seat rail fixed to the seat, displaceable in relation to the first seat rail and guided in same, and at least one position detection means with a sensor.

BACKGROUND OF THE INVENTION

A longitudinal adjuster of this type has become known from U.S. Pat. No. 7,521,924 B2. To detect a position of the seat, a sensor, which is arranged on a seat rail fixed to the seat, cooperates with a flat magnet, which has a predetermined pole arrangement, arranged in the seat rail fixed to the vehicle structure at the bottom thereof. The magnet is hereby arranged at one end of the seat rail. The magnetic field detected by the sensor changes due to the moving of the magnet.

Another sensor array with a Hall sensor has become known from U.S. Pat. No. 7,439,735 B2. In this case, the sensor array is arranged outside of the seat rail fixed to the seat and cooperates with an edge area, which is bent upwards and inwards, of the seat rail fixed to the vehicle structure, whose end it detects. In this case an air gap between the sensor array and the edge area of the seat rail fixed to the vehicle structure to be detected is between 0.5 mm and 2.75 mm.

SUMMARY OF THE INVENTION

The basic object of the present invention is to improve a longitudinal adjuster of the type mentioned in the introduction.

According to the invention, a longitudinal adjuster is provided for a vehicle seat and has a first seat rail fixed to the vehicle structure and arranged on a vehicle floor and a second seat rail fixed to the seat and displaceable in relation to the first seat rail and guided in same. A position detection device is provided with a sensor having a magnet and a Hall element. The sensor is arranged in the interior of the second seat rail and is aligned with a flat area associated with the first seat rail in which one end of the flat area corresponds to the end of the rail and the flat area forms a detection area. The sensor is used to detect an end of the detection area. The sensor has a certain detection range and the distance between the sensor and the detection area lies within the certain detection range of the sensor. The distance between the sensor and the vehicle floor lies outside of the certain detection range of the sensor.

The longitudinal adjuster for a vehicle seat is preferably a longitudinal adjuster that can be actuated mechanically (manually), wherein an electric (motor) actuation may also be possible. Herein, the sensor is arranged in the interior of one of the seat rails, as a result of which it is accommodated in a space-saving manner and especially protected against damage. It cooperates with the opposing seat rail and detects its end opposite the floor of the vehicle arranged more or less directly under it. Via a control device, which is connected to the sensor, a corresponding signal can be sent when the end of the seat rail is reached, and especially a signal such that the adjusting motion of the vehicle seat is stopped and/or an airbag is deactivated.

An array according to the present invention especially makes it possible that a rail end arranged in close or immediate vicinity of the floor of the vehicle can be detected with certainty, as a result of which a laterally bent-up area of the seat rail fixed to the vehicle structure does not have to be used as a detection area, so that a relatively low structural height can be embodied in conjunction with a protected array of the sensor/magnet.

The costs for the position detection means can be reduced by using a Hall sensor, wherein other sensors may also be used, which are especially able to detect the end of the opposing seat rail. The sensor is arranged for this at the seat rail fixed to the seat, and preferably at a special bracket, and is aligned in the direction of the opposing seat rail fixed to the vehicle structure.

The longitudinal adjuster according to the present invention can be used for all vehicle seats, in which the information about the longitudinal position of the seat is analyzed, for which the sensor is connected to a control device in a manner known per se. It may be used especially for the activation and deactivation of an airbag.

The present invention is explained in detail below based on an exemplary embodiment with variants shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a lateral view of a pair of seat rails of the longitudinal adjuster;

FIG. 2 is a front view of a pair of seat rails of the longitudinal adjuster;

FIG. 3 is a schematic view of the vehicle seat;

FIG. 4 is a schematic view of the vehicle seat of FIG. 3 in a different longitudinal position;

FIG. 5 is a view, corresponding to FIG. 2, of a variant of the longitudinal adjuster in relation to the sensor array;

FIG. 6 is a view, corresponding to FIG. 2, of a second variant of the longitudinal adjuster in relation to the sensor array;

FIG. 7 is a view, corresponding to FIG. 2, of a third variant of the longitudinal adjuster in relation to the sensor array; and FIG. 8 is a lateral view of the longitudinal adjuster of FIG. 7.

DESCRIPTION OF THE PREFERRED EMBODIMENTS

Referring to the drawings in particular, a longitudinal adjuster 1 for a vehicle seat 3 of a motor vehicle has, on each side of the vehicle seat, a first seat rail 5 to be connected to the vehicle structure of the motor vehicle and a second seat rail 8 connected to the seat structure of the vehicle seat 3. The second seat rail 8 which is used as a slide rail is guided in a longitudinally displaceable manner in the first seat rail 5, which is used as a guide rail, with the insertion of balls (not shown). Both seat rails 5 and 8 have a profile with an essentially U-shaped basic shape with bent-over edge areas, wherein the edge areas of the first seat rail 5 are bent inwards and those of the second seat rail 8 are bent outwards. The profiles of the two seat rails 5 and 8 facing one another alternately grasp one another from behind with the edge areas.

The longitudinal adjuster 1 may be actuated electrically. An electric seat longitudinal adjustment, as disclosed, for example, in DE 198 15 283 C2, comprises, in a manner that is well known per se, a spindle, which is arranged within the structural space enclosed by the profiles of the two seat rails 5, 8 and is preferably rigidly connected to the first seat rail 5. On the second seat rail 8 sits a motor with a gear, which has a spindle nut, which runs along the spindle.

As an alternative, the longitudinal adjuster 1 may also be actuated manually and may have electric switching functions. Such a longitudinal adjuster 1 is locked in a manner known per se for seat use, wherein a locking device (not shown) is provided at both pairs of seat rails 5, 8, respectively. By means of a joint unlocking of the locking devices, the second seat rails 8 can be displaced in relation to the first seat rails 5 and thus the longitudinal position of the vehicle seat 1 can be adjusted. This may be an ordinary longitudinal adjustment, in which the end position of the adjustment movement shall be maintained, a part of a free-pivot movement, in which the backrest 14 of the vehicle seat 3 is tilted forwards and then the vehicle seat 3 is pushed forwards as a whole to facilitate the access to a rear row of seats, whereupon subsequently the vehicle seat 3 and its backrest 14 are again brought into the starting positions.

The locking device has a catch plate (not shown) with a plurality of snap-in teeth movably arranged in the second seat rail 8 and spring-loaded, which cooperates with a uniform row of catches 15 and webs 17 of the first seat rail 5, which are designated below as a row of locks 19. In the present case, the row of locks 19 is embodied as a row of teeth open downwards in the edge area of the first seat rail 5 lying on the inside. However, it may also be a row of windows or other hole patterns. Instead of the catch plate, individual snap-in bolts, a plurality of catch plates or other catch elements may also be provided in a modified embodiment.

The features described below are present both in the electric and in the manual alternatives.

In the present case, a position detection means 20 assigned to the second seat rail 8 is essentially arranged in the front end area in the interior of the second seat rail 8, as evident from FIG. 1. The position detection means 20 comprises a sensor 24, in the present case a hall sensor with assigned permanent magnet and an electronic analyzer, which is directed through the bottom opening of the second seat rail 8 downwards in the direction of the first seat rail 5, signal lines as well as a control device. In this case, depending on the space requirement of the individual components, parts of the position detection means 20, such as, for example, parts of the control device, may also be arranged outside of the second seat rail 8. In a modified embodiment, even an optical sensor may be used as a sensor. The sensor 24 is arranged in a sensor housing 22, which is mounted on the second seat rail 8 by means of a metal plate 28 arranged at the top on the sensor housing 22, by means of screws in the present case. Of course, any other mounting possibilities are also possible, such as, for example, welding, soldering, bonding, clipping or locking. The energy supply of the sensor 24 as well as the connection of the signal lines to the electronic analyzer of the sensor 24 takes place via a plug (not shown), which in the present case is inserted from the front into a bushing 26 formed at the sensor housing 22. In this case, a projection is preferably provided on the upper side of the bushing 26 for fixing the plug.

The said metal plate 28 is arranged above the sensor housing 22. The metal plate 28 consists of a magnetically conductive material, steel or iron in the present case. It guarantees that a magnetic circle is closed. However, its function may also be taken over directly by the sensor housing or possibly the second seat rail 8.

In the present case, the gap between the sensor 24 and first seat rail 5 is approx. 2.5 mm, wherein a tolerance range of ±1.6 mm is provided, i.e., the minimum gap between sensor 24 and the surface of the first seat rail 5 is 0.9 mm, the maximum gap is 4.1 mm.

The sensor 24 has a detection range from 0 mm up to approx. 4.1 mm in the present case, with a too negligible area of uncertainty or range of uncertainty (uncertain detection range). Thus, there is a maximum certain detection range of 0 mm to 4.1 mm and a certain range from 4.1 mm lying outside of the detection range.

The material thickness of the sheet metal forming the first seat rail 5 is 3.3 mm in the present case in order to make possible a certain detection of the end of the rail even in case of a minimal gap. Thus, the end of the rail—despite the vehicle floor 10 lying in direct vicinity—is detected with certainty when moving, and a corresponding signal can be forwarded by the sensor 24 via the signal lines to a control device, which—depending on the control provided—for example, provides for a turning off of the drive of the electric longitudinal adjustment of the vehicle seat and/or releases the backrest lock in case of reaching the front end position. A signal triggered by the sensor 24 that the end of the rail has been reached deactivates corresponding airbags after it has been suitably converted in a control device. Regardless of providing a sensor 24, mechanical end stops may be provided for limiting the longitudinal displaceability of the vehicle seat, wherein the mechanical end stops limit a somewhat greater path of adjustment than the sensor or the sensors.

In the present case, a corresponding sensor array is also arranged in the rear end area of the second seat rail 8 with bushing pointing backwards, such that the reaching of the rear end of the first seat rail 5 may also be detected in a simple manner.

The sensor 24 functions as follows: If the sensor 24 passes over the end of the first seat rail 5, then the end of the rail is detected during the passing over as a result of a change in the magnetic field (absent outside of the seat rail) and a corresponding signal is forwarded by the sensor 24 via the signal lines to a control device. The position detection means 20, formed by sensor 24, signal lines and control device, exclusively delivers a binary signal, which reproduces the presence or absence of the magnetic field forwarded by the first seat rail 5.

Variants of the exemplary embodiment, some with reference to the drawing, are described in detail below. The same reference numbers are used here as in the exemplary embodiment.

According to a first variant of the exemplary embodiment shown in FIG. 5, the sensor 24 with its housing is attached directly to the second seat rail 8 without insertion of a metal plate 28. The sensor 24 and rail arrangement are structurally identical to the above-described exemplary embodiment. To reduce the upwards enlarged gap between sensor 24 and first seat rail 5 by shifting the sensor array, a metal plate 5' is arranged on the upper side of the first seat rail 5. In this case, this metal plate 5' forms a part of the first seat rail 5 and extends over the entire length of same. The thickness of the metal plate 5' is selected here such that an optimal distance is provided between the sensor 24 and the first seat rail 5.

In the present case, the sensor 24 has a detection range of 0 mm to 4.1 mm with an uncertainty area (uncertain detection range) of ±0.2 mm. This yields a maximum certain detection range of 0 mm to 3.9 mm. Furthermore, "nothing" is detected if the distance is greater than 4.3 mm. A distance between sensor 24 and metal plate 5' of approx. 2.5 mm, wherein a tolerance range of ±1.2 mm is given, yields a possible distance of 1.3 mm min. and 3.7 mm max., so that the distance always lies in the certain detection range.

The total thickness of the rail 5 in the area of measurement, i.e., the material thickness of the rail 5 and the metal plate 5' mounted on it is approx. 3.5 mm in the present case. Consequently, it can be guaranteed that even in case of the minimal distance of 1.3 mm, the end of the rail can be detected with certainty by a distance of sensor 24 and vehicle floor 10 of 4.8 mm.

This arrangement has the advantage that the distance of the sensor 24 to the vehicle floor, to which the first seat rail 5 is fastened, is increased, i.e., the difference between the sensor-metal plate/rail distance and sensor-vehicle floor is increased, so that the seat rail end can be detected with more certainty than without a metal plate.

However, the sensor of the above exemplary embodiment, which has a negligible uncertainty area, may also be used.

Another advantage of a continuous metal plate 5' made of magnetically conductive material which is mounted in the interior of the seat rail 5 is, furthermore, that seat rails made of aluminum or of another, non-magnetically conductive material may also be used.

Instead of providing a metal plate that is separately formed and subsequently mounted on the seat rail 5, the seat rail may, of course, also be designed as correspondingly thicker, folded and/or bent up or arched up in this area, so that it has an elevated design in the direction of the sensor 24 and it reduces the distance between sensor and rail corresponding to the variant with a metal plate, but the distance to the floor of the vehicle is increased.

FIG. 6 shows a variant with bent-up rail bottom 5", so that the difference of the distance from the sensor 24 to the rail 5 and from the sensor 24 to the vehicle floor 10 is increased. The position of the surface of the bent-up rail bottom 5" corresponds here to the position of the surface of the metal plate 5' according to the above-described variant, so that, with otherwise identical dimensions, the rail end can in turn be detected with certainty by the sensor 24; however, the floor of the vehicle 10 is arranged outside of the detection range of the sensor 20.

FIGS. 7 and 8 show another variant, according to which the embodiment of the rail arrangement corresponds to that of the exemplary embodiment; however, the seat rail 5 fixed to the structure of the vehicle is arranged somewhat spaced from the vehicle floor 10 by traverses or spacers 5'". This arrangement also makes possible an increase in the distance difference from the sensor 24 to the rail 5 and from the sensor 24 to the vehicle floor 10, so that the end of the rail can be detected by the sensor 24 with certainty, but the vehicle floor 10 is arranged outside of the detection range of the sensor 20.

Instead of traverses, of course, the metal plate 5' according to the variant of FIG. 5 may also be arranged as a spacer 5'" under the rail, in order to bring about a certain detection of the rail end in case of too thin rails 5.

Of course,—with sufficiently great or too great distance between sensor 24 and first seat rail 5—a metal plate 5' may also be mounted on the first seat rail 5 in case of the exemplary embodiment. This arrangement also leads to the above-described advantages in relation to a certain detection of the rail end.

According to another variant (not shown in the drawing), the traverses or spacers may also be formed directly by the structure of the vehicle floor. However, it must be guaranteed here that an elevated area of the vehicle floor is not provided at the end of the rail, so that a sufficient distance is given between sensor and vehicle floor.

Instead of a Hall sensor, any other sensor may be used as well, which is additionally capable of detecting the seat rail end against the vehicle floor arranged in direct vicinity and of delivering a binary signal. For example, it may be an optical sensor.

While specific embodiments of the invention have been described in detail to illustrate the application of the principles of the invention, it will be understood that the invention may be embodied otherwise without departing from such principles.

APPENDIX

List of Reference Numbers

1 Longitudinal adjuster
3 Vehicle seat
5 First seat rail
5' Metal plate
5" Bent-up bottom of rail
5'" Spacer
8 Second seat rail
10 Vehicle floor
14 Backrest
15 Catch
17 Web
19 Row of locks
20 Position detection means
22 Sensor housing
24 Sensor
26 Bushing

What is claimed is:

1. A longitudinal adjuster for a vehicle seat, the longitudinal adjuster comprising:
   a first seat rail fixed to vehicle structure and arranged on a vehicle floor, the first seat rail having a flat area comprised of at least one of an integral first rail flat area, which is adjacent to the floor and extends along a longitudinal direction of the rails to an end corresponding to an end of the first seat rail and a connected flat area, which is connected to the first seat rail and positioned adjacent to the floor and extends along the longitudinal direction of the rails to an end corresponding to an end of the first seat rail;
   a second seat rail fixed to the seat and displaceable in relation to the first seat rail and guided in same;
   a position detection means with a sensor having a magnet and a Hall element, wherein:
   the sensor is arranged in the interior of the second seat rail fixed to the seat;
   the sensor is aligned in a direction of a flat area of the first rail;
   the flat area forms a detection area;
   the sensor detects an end of the detection area, the sensor having a detection range including a certain detection range and an uncertain detection range; and
   the distance between the sensor and the detection area lies within the certain detection range of the sensor; and
   the distance between the sensor and the vehicle floor lies outside of the certain detection range and outside the uncertain detection range of the sensor.

2. A longitudinal adjuster in accordance with claim 1, wherein the distance between the detection area and the vehicle floor at the end of the detection area is maximally as large as twice the size of the certain detection range including twice the size of the uncertain detection range.

3. A longitudinal adjuster in accordance with claim 2, wherein the distance between the detection area and the vehicle floor at the end of the detection area is maximally as large as the certain detection range plus the uncertain detection range.

4. A longitudinal adjuster in accordance with claim 1, wherein the material thickness of sheet metal forming the first seat rail is greater than the uncertain detection range of the sensor at least in the detection area, wherein the distance between the sensor and the surface of the seat rail forming the detection area lies within the certain detection range of the sensor.

5. A longitudinal adjuster in accordance with claim 1, wherein the sheet metal forming the first seat rail is bent upwards in the detection area in such a way that the material thickness of the sheet metal including the raised part is greater than the uncertain detection range of the sensor, wherein the distance between the sensor and the surface of the seat rail forming the detection area in the raised area lies within the certain detection range of the sensor.

6. A longitudinal adjuster in accordance with claim 1, wherein the first seat rail consists essentially of a non-magnetically conductive material, and a metal plate which forms the detection area and ends at the same height as the seat rail, is arranged at the first seat rail opposite the sensor.

7. A longitudinal adjuster in accordance with claim 1, wherein a spacer is arranged between the first seat rail and the vehicle floor and/or a metal plate is arranged in the first seat rail to form the connected flat area, wherein the material thickness of the first seat rail in the detection area including the height of the spacer and/or of the metal plate is greater than the uncertain detection range of the sensor, and the distance between the sensor and the detection area lies within the certain detection range of the sensor.

8. A longitudinal adjuster for a vehicle seat, the longitudinal adjuster comprising:
a first seat rail fixed to the vehicle structure and arranged relative to a vehicle floor, the first seat rail having a flat area comprised of at least one of an integral first rail flat area, which is adjacent to the floor and extends along a longitudinal direction of the rails to an end corresponding to an end of the first seat rail and a connected flat area, which is connected to the first seat rail and positioned adjacent to the floor and extends along the longitudinal direction of the rails to an end corresponding to an end of the first seat rail;
a second seat rail fixed to the seat and displaceable in relation to the first seat rail and guided in the first seat rail;
a sensor, wherein:
the sensor is arranged in the interior of the second seat rail fixed to the seat;
the sensor has a detection range directed toward the flat area of the first rail;
the flat area forms a detection area, and the sensor detects an end of the detection area;
the sensor detection range has a certain detection range and an uncertain detection range;
the distance between the sensor and the detection area lies within the certain detection range of the sensor; and
the distance between sensor and vehicle floor lies outside of the detection range of the sensor.

9. A longitudinal adjuster in accordance with claim 8, wherein at least the second seat rail, in which the sensor is arranged, is bent in a U-shape, wherein the sensor is arranged between two legs of the U-shape.

10. A motor vehicle seat comprising a seat part and a longitudinal adjuster, the longitudinal adjuster comprising:
a first seat rail fixed to vehicle structure and arranged relative to a vehicle floor, the first seat rail having an integral flat area or being connected to a structure forming a connected flat area, wherein one end of the integral flat area or the connected flat area corresponds to an end of the rail and the flat area defines a detection area;
a second seat rail fixed to the seat part and displaceable in relation to the first seat rail and guided in same;
a sensor arranged in the interior of the second seat rail and being fixed thereto, the sensor being directed downwardly toward the detection area and toward the vehicle floor and detecting an end of the detection area, the sensor having a detection range comprised of a certain detection range and an uncertain detection range, the distance between the sensor and the detection area being within the certain detection range of the sensor, and the distance between sensor and vehicle floor being outside of the detection range.

11. A motor vehicle seat in accordance with claim 10, wherein the distance between the detection area and the vehicle floor at the end of the detection area is maximally as large as twice the size of the certain detection range including twice the size of the uncertain detection range.

12. A motor vehicle seat in accordance with claim 11, wherein the distance between the detection area and the vehicle floor at the end of the detection area is maximally as large as the certain detection range plus the uncertain detection range.

13. A motor vehicle seat in accordance with claim 10, wherein the material thickness of sheet metal forming the first seat rail is greater than the uncertain detection range of the sensor at least in the detection area, wherein the distance between the sensor and the surface of the seat rail forming the detection area lies within the certain detection range of the sensor.

14. A motor vehicle seat in accordance with claim 10, wherein the sheet metal forming the first seat rail is bent upwards in the detection area in such a way that the material thickness of the sheet metal including the raised part is greater than the uncertain detection range of the sensor, wherein the distance between the sensor and the surface of the seat rail forming the detection area in the raised area lies within the certain detection range of the sensor.

15. A motor vehicle seat in accordance with claim 10, wherein the first seat rail consists essentially of a non-magnetically conductive material, and the structure forming a connected flat area is a metal plate which forms the detection area and ends at the same height as the seat rail, the metal plate being arranged at the first seat rail opposite the sensor.

16. A motor vehicle seat in accordance with claim 10, wherein a spacer is arranged between the first seat rail and the vehicle floor to space the integral flat area from the vehicle floor and/or a metal plate as the structure forming a connected flat area is arranged in the first seat rail, wherein the material thickness of the first seat rail in the detection area including the height of the spacer and/or of the metal plate is greater than the uncertain detection range of the sensor, and the distance between the sensor and the detection area lies within the certain detection range of the sensor.

* * * * *